United States Patent
Shim (10) Patent No.: US 7,257,872 B2
(45) Date of Patent: Aug. 21, 2007

(54) ELECTRODE TIP DRESSER

(75) Inventor: Dong Il Shim, Anyang (KR)

(73) Assignee: Kyokutoh Korea Corporation, Ansan (KR)

( * ) Notice: Subject to any disclaimer, the term of this patent is extended or adjusted under 35 U.S.C. 154(b) by 0 days.

(21) Appl. No.: 11/363,469

(22) Filed: Feb. 27, 2006

(65) Prior Publication Data
US 2007/0127998 A1 Jun. 7, 2007

(30) Foreign Application Priority Data
Dec. 1, 2005 (KR) .................. 10-2005-0116312

(51) Int. Cl.
*B23K 11/30* (2006.01)
*B23C 3/12* (2006.01)
*B23C 1/00* (2006.01)

(52) U.S. Cl. .................. 29/33 K; 409/140; 409/139; 219/119

(58) Field of Classification Search ............ 29/33 K, 29/33 R, 402.17; 409/137, 138, 139, 140, 409/175, 180, 181, 182; 408/203.5; 219/119, 219/117.1; 72/126; 451/65, 68
See application file for complete search history.

(56) References Cited

U.S. PATENT DOCUMENTS

| | | | | |
|---|---|---|---|---|
| 4,578,005 | A * | 3/1986 | Fuse et al. .................. | 409/140 |
| 4,610,153 | A * | 9/1986 | Nedorezov .................. | 72/112 |
| 4,856,949 | A * | 8/1989 | Shimada ..................... | 409/140 |
| 4,865,498 | A * | 9/1989 | Schoettler et al. .......... | 409/175 |
| 4,966,504 | A * | 10/1990 | Seme et al. ................. | 409/140 |
| 4,966,506 | A * | 10/1990 | Slanker ...................... | 409/140 |
| 5,401,127 | A * | 3/1995 | Nakajima et al. .......... | 409/131 |
| 5,531,370 | A * | 7/1996 | Rohrberg ................ | 228/173.4 |
| 5,725,340 | A * | 3/1998 | Nakajima et al. .......... | 409/140 |
| 5,993,125 | A * | 11/1999 | Shimada ..................... | 409/140 |
| 6,151,124 | A * | 11/2000 | Visscher ..................... | 356/445 |

(Continued)

FOREIGN PATENT DOCUMENTS

JP  11179562 A  *  7/1999

(Continued)

*Primary Examiner*—Dana Ross
(74) *Attorney, Agent, or Firm*—Worman Nydegger (57) ABSTRACT

An electrode tip dresser is disclosed which can dress a pair of electrode tips to a usable state while achieving a desired accuracy of a tip surface of each electrode tip including an angular portion at a peripheral edge of the tip surface, without separating each electrode tip from a welding gun. The electrode tip dresser includes a holder which is rotatable about a common axis of electrode tips, a pair of support shafts which are held by the holder, are arranged in parallel in an approach direction of the electrode tips, and extend in a direction orthogonal to the approach direction, and a pair of dressing rollers which are rotatably supported by the support shafts, respectively, to dress the electrode tips to a usable state. Each dressing roller includes a groove which has a cross-section conforming to the outline of the tip section of the associated electrode tip when the cross-section is taken in a direction orthogonal to the associated support shaft, and the outline is taken after the dressing of the electrode tip. Each dressing roller includes two axially-divided roller bodies. The dividing plane of the divided roller bodies is arranged at the center of the tip surface of the associated electrode tip in a direction orthogonal to the axis of the associated electrode tip.

5 Claims, 9 Drawing Sheets

U.S. PATENT DOCUMENTS

| | | | |
|---|---|---|---|
| 6,184,487 B1 * | 2/2001 | Visscher | 219/91.1 |
| 6,195,860 B1 * | 3/2001 | Di Rosa et al. | 29/33 R |
| 6,666,631 B2 * | 12/2003 | Yajima et al. | 409/137 |
| 6,722,004 B2 * | 4/2004 | Recupero | 29/33 R |
| 6,863,597 B2 * | 3/2005 | Sunaga et al. | 451/160 |
| 2002/0044847 A1 * | 4/2002 | Yajima et al. | 409/140 |
| 2003/0013395 A1 * | 1/2003 | Sakai | 451/453 |
| 2004/0149692 A1 * | 8/2004 | Masanori | 219/86.25 |
| 2005/0211677 A1 * | 9/2005 | Chen | 219/117.1 |

FOREIGN PATENT DOCUMENTS

JP    2002321069 A  *  11/2002

* cited by examiner

Circumferential Direction about Axes of Electrode Tips

ELECTRODE TIP DRESSER

This application claims the benefit of Korean Patent Application No. 2005-0116312, filed Dec. 1, 2005, which is hereby incorporated by reference as if fully set forth herein.

BACKGROUND OF THE INVENTION

1. Field of the Invention

The present invention relates to an electrode tip dresser which dresses a pair of electrode tips held in a welding gun for spot welding while minimizing a grinding task inevitably involving formation of swarf.

2. Discussion of the Related Art

There are conventional electrode tip dressers which can dress electrode tips for spot welding while minimizing a grinding task involving formation of swarf. In such conventional electrode tip dressers, a die is used on which a deformed electrode tip is pressed so that the electrode tip is dressed (as disclosed in, for example, Japanese Patent Laid-open Publication Nos. 2004-167535 and 2001-138065).

When an electrode tip is dressed using such an electrode tip dresser, it is possible to reduce the loss of the material of the electrode tip, as compared to traditional methods in which the electrode tip is dressed using a polishing or grinding process. For this reason, such an electrode tip dresser has been advantageously used for an electrode tip, which is used in a spot welding task, in that it is possible to reduce the loss of the material of the electrode tip, and thus, to use the electrode tip for a prolonged period of time.

The electrode tip, which is used in a spot welding task, has a tip section, and a cylindrical shank section. The tip section of the electrode tip has a circular tip surface that contacts a work piece to be welded, and an enlarged diameter portion having a diameter increasing as it extends from the peripheral edge of the tip surface to the shank section. In such an electrode tip, it is important to secure the shape of an angular portion formed at the peripheral edge of the circular tip surface, namely, at the boundary between the tip surface and the enlarged diameter portion, in order to secure the shape and area of the tip surface required for a spot welding task.

For this reason, the electrode tip, which has been deformed after being used in a certain number of welding processes, is pressed on a die at a high pressure in the above-mentioned conventional electrode tip dresser, to plastically deform the tip portion of the electrode tip, and thus, to dress (regenerate) the electrode tip.

However, when dressing of an electrode tip is carried out using the conventional electrode tip dresser, it is necessary to separate the electrode tip from a welding gun. In other words, it is impossible to dress the electrode tip in a state in which the electrode tip is held in the welding gun.

SUMMARY OF THE INVENTION

Accordingly, the present invention is directed to an electrode tip dresser that substantially obviates one or more problems due to limitations and disadvantages of the related art.

An object of the present invention is to provide an electrode tip dresser which can dress a pair of electrode tips to a usable state while achieving a desired accuracy of a tip surface of each electrode tip including an angular portion at a peripheral edge of the tip surface, without separating each electrode tip from a welding gun.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrode tip dresser for dressing a pair of electrode tips for spot welding held by a welding gun, each of the electrode tips including a tip section and a cylindrical shank section, the tip section having a circular tip surface and an enlarged diameter portion having a diameter increasing as the portion extends from the peripheral edge of the tip surface to the shank section, the electrode tips being held by the welding gun such that the tip sections of the electrode tips are movable toward each other, comprises: a holder which is rotatable in a circumferential direction about a common axis of the electrode tips; a pair of support shafts which are held by the holder, are arranged in parallel in an approach direction of the electrode tips, and extend in a direction orthogonal to the approach direction of the electrode tips; and a pair of dressing rollers which are rotatably supported by the support shafts, respectively, such that the dressing rollers are arranged in parallel in the approach direction of the electrode tips, and which dress the electrode tips to a usable state while rotating in accordance with the rotation of the holder when the electrode tips are pressed against the dressing rollers, respectively, as the electrode tips are moved toward each other, wherein each of the dressing rollers includes a groove which has a cross-section conforming to an outline of the tip section of an associated one of the electrode tips when the cross-section is taken in a direction orthogonal to an associated one of the support shafts, and the outline is taken after the dressing of the associated electrode tip, wherein each of the dressing rollers includes two divided roller bodies, into which the dressing roller is axially divided along a dividing plane, and the dividing plane is arranged in a region extending from a peripheral edge of the tip surface of the associated electrode tip to a center of the tip surface in a direction orthogonal to the axis of the associated electrode tip in a dressed state of the associated electrode tip.

In the electrode tip dresser, the electrode tips held by the welding gun are moved toward each other and into the holder such that the electrode tips are pressed against the dressing rollers, respectively. The dressing rollers then rotate in a circumferential direction about the common axis of the electrode tips, together with the holder, while rotating about respective support shafts. Thus, the dressing rollers dress the electrode tips such that the electrode tips have a shape conforming to that of the grooves of the dressing rollers.

Since each of the dressing rollers is divided into two divided roller bodies arranged at opposite sides of the dividing plane positioned at the center of the tip surface of the associated electrode tip in a direction orthogonal to the axis of the electrode tip, the divided roller bodies of the dressing roller dress the tip surface and enlarged diameter portion of the electrode tip while rotating in opposite directions, respectively, during the rotation of the holder. Since the divided roller bodies can continuously dress an integrated portion of the associated electrode tip extending from the tip surface to the enlarged diameter portion via the angular portion formed at the peripheral edge of the tip surface, it is possible to accurately dress the tip-section-side portions of each electrode tip, namely, the tip surface and the angular portion arranged at the peripheral edge of the tip surface, to desired shapes, respectively.

The contact between the dressing rollers and the associated electrode tips is approximately linear contact in an axial direction of the outer peripheral surfaces of the dressing rollers. Accordingly, it is possible to plastically deform the electrode tips at a low speed, even using a small pressure applied to the electrode tips by the welding gun such that the electrode tips are moved toward each other, and thus, to dress the electrode tips to a desired shape.

It is also possible to rapidly dress the entire portion of the tip section of each electrode tip by increasing the RPM of the holder, even when only a portion of each electrode tip is dressed.

Accordingly, the electrode tip dresser can rapidly dress (regenerate) the electrode tips to a usable state because it is possible to secure a desired accuracy of the tip surface of each electrode tip including the angular portion at the peripheral edge of the tip surface without separating the electrode tips and without resulting in formation of swarf.

The support shafts may extend orthogonally to each other. Each dressing roller has an approximately hourglass-shaped structure such that the dressing roller has the groove which has a cross-section conforming to the outline of the tip section of the associated electrode tip when the cross-section is taken in a direction orthogonal to the associated support shaft, and enlarged diameter portions which are arranged at opposite axial ends of the dressing roller. Accordingly, when the dressing rollers are arranged such that the support shafts thereof are orthogonal to each other, it is possible to closely arrange the support shafts without causing the enlarged diameter portions of the dressing rollers to interfere with each other. Therefore, it is possible to reduce the installation space of the dressing rollers, as compared to the case in which the dressing rollers are arranged such that the support shafts are parallel to each other. Thus, it is possible to reduce the volume, in particular, thickness, of the holder. By virtue of this fact, it is possible to install the electrode tip dresser within a reduced space in a place where a welding task is carried out.

Guide members may be arranged in the vicinity of the holder. The guide members may be provided with guide holes to guide the electrode tips when the electrode tips are pressed against the dressing rollers, respectively, such that the shank sections of the electrode tips are prevented from being joggled in a direction orthogonal to the common axis of the electrode tips during a dressing process.

When the dressing rollers have a small outer diameter, there may be a possibility that the electrode tips may escape from the outer peripheral surfaces of the dressing rollers when the electrode tips are pressed against the dressing rollers, respectively. This possibility can be prevented by restraining the outer peripheral surface of the shank sections of each electrode tip by the inner peripheral surface of the guide hole of the associated guide member. That is, it is possible to smoothly dress the electrode tips even when the dressing rollers are configured to have a small outer diameter in order to reduce the installation space of the electrode tip dresser.

In another aspect of the present invention, an electrode tip dresser for dressing a pair of electrode tips for spot welding held by a welding gun, each of the electrode tips including a tip section and a cylindrical shank section, the tip section having a circular tip surface and an enlarged diameter portion having a diameter increasing as the portion extends from the peripheral edge of the tip surface to the shank section, the electrode tips being held by the welding gun such that the tip sections of the electrode tips are movable toward each other, comprises: a holder which is rotatable in a circumferential direction about a common axis of the electrode tips; a pair of support shafts which are held by the holder, are arranged in parallel in an approach direction of the electrode tips, and extend in a direction orthogonal to the approach direction of the electrode tips; and a pair of dressing rollers which are rotatably supported by the support shafts, respectively, such that the dressing rollers are arranged in parallel in the approach direction of the electrode tips, and which dress the electrode tips to a usable state while rotating in accordance with the rotation of the holder when the electrode tips are pressed against the dressing rollers, respectively, as the electrode tips are moved toward each other, wherein each of the dressing rollers includes a pair of divided roller bodies which are arranged at opposite end portions of an associated one of the support shafts, and have an approximately truncated conical shape, and a cutter which is arranged between the divided roller bodies, wherein the cutter is provided with a cutting blade which extends in a direction orthogonal to an axis of the associated support shaft, and cuts an associated one of the electrode tips during the rotation of the holder such that the tip surface of the associated electrode tip is dressed to a usable state, wherein each of the divided roller bodies includes a groove having a main portion which has a cross-section conforming to an outline of the enlarged diameter portion of the associated electrode tip in a dressed state of the associated electrode tip, when the cross-section is taken in a direction orthogonal to an associated one of the support shafts, and the outline is taken after the dressing of the associated electrode tip, and an extension portion which is connected to the main portion, is arranged at the side of the cutter, and extends from the main portion toward the associated support shaft.

The electrode tips are moved toward each other and into the holder such that the electrode tips are pressed against the dressing rollers, respectively. The dressing rollers then rotate in a circumferential direction about the common axis of the electrode tips, together with the holder. Simultaneously, the divided roller bodies of each dressing roller are rotated about the associated support shaft, thereby dressing the enlarged diameter portion of the associated electrode tip such that the enlarged diameter portion has a shape conforming to that of the grooves of the divided roller bodies. Also, the cutter cuts the tip surface of the associated electrode tip using the cutting blade, to dress the tip surface.

The groove of each divided roller body includes the main portion which has a cross-section conforming to the outline of the enlarged diameter portion of the associated electrode tip, and the extension portion which is connected to the main portion, is arranged at the side of the cutter, and extends from the main portion toward the associated support shaft, when the cross-section is taken in a direction orthogonal to the axis of the support shaft, and the outline is taken after the dressing of the electrode tip. Accordingly, when the divided roller bodies of each dressing roller dress the enlarged diameter portion of the associated electrode tip by plastically deforming the enlarged diameter portion, a surplus portion of the tip material of the electrode tip is extruded from the main portion of the groove along the extension portion. The extruded surplus portion of the tip material is cut by the cutting blade of the cutter. Thus, it is possible to dress the tip section of each electrode tip, namely, the tip surface and the angular portion formed at the peripheral edge of the tip surface, to a desired shape with a high accuracy.

Since the enlarged diameter portion of each electrode tip is not cut during the dressing process, even though the tip surface of each electrode tip is cut, it is possible to suppress formation of swarf as much as possible. That is, it is possible to dress the electrode tips while suppressing the consumption of the tip material.

Accordingly, the electrode tip dresser can rapidly dress the electrode tips to a usable state because it is possible to secure a desired accuracy of the tip surface of each electrode tip including the angular portion at the peripheral edge of the tip surface without separating the electrode tips and while suppressing formation of swarf as much as possible.

The cutter may include restraining surfaces which are arranged at opposite sides of the cutting blade in the direction orthogonal to the axis of the associated support shaft, respectively, to restrain the enlarged diameter portion of the associated electrode tip, and thus, to prevent the associated electrode tip from joggling in the direction orthogonal to the axis of the electrode tip during a dressing process. Accordingly, even in the case in which the dressing rollers have a small outer diameter, it is possible to prevent the electrode tips from escaping from the outer peripheral surfaces of the dressing rollers when the electrode tips are pressed against the dressing rollers, respectively. This is because the electrode tips are restrained by the restraining surfaces of the cutters. Accordingly, it is possible to smoothly dress the electrode tips even when the dressing rollers are configured to have a small outer diameter in order to reduce the installation space of the electrode tip dresser.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
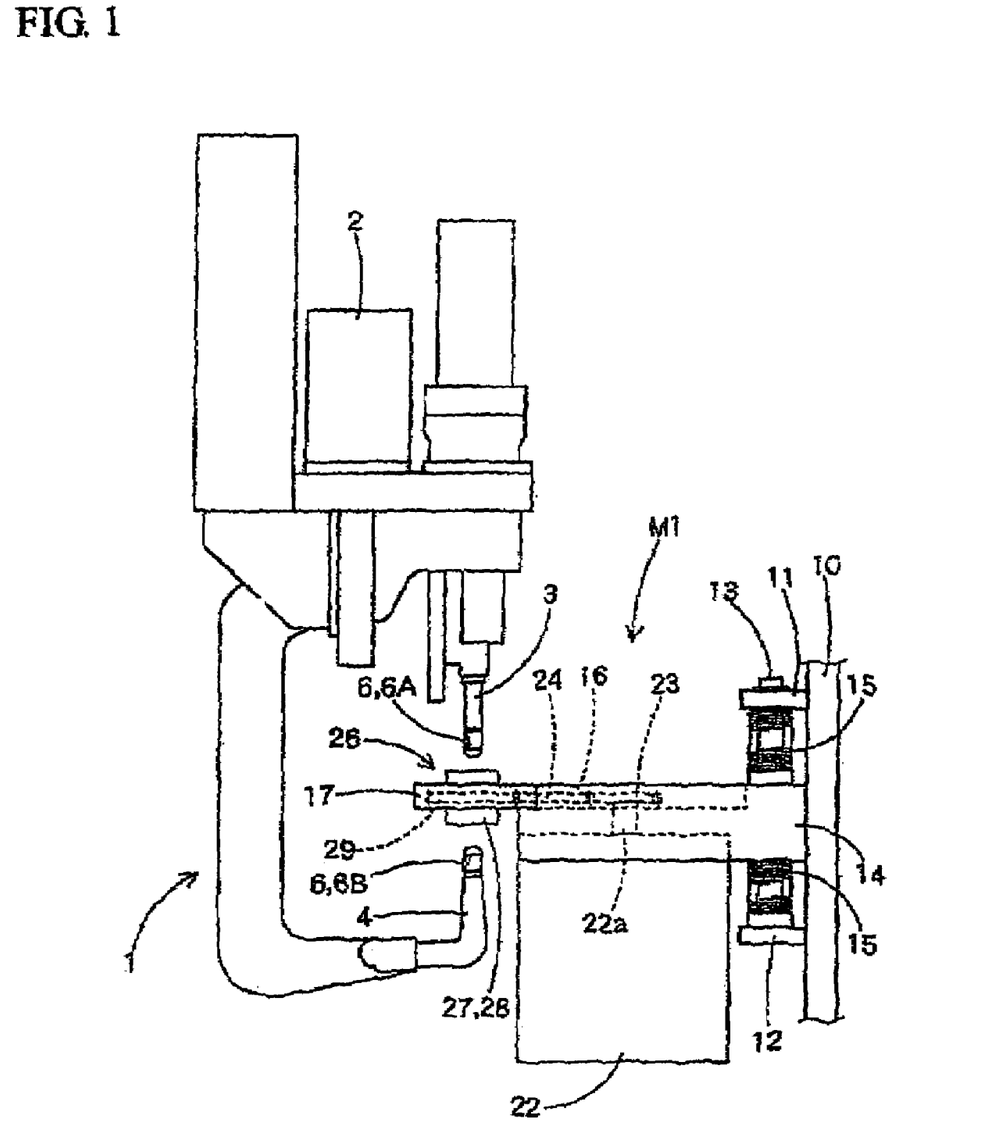
FIG. 1 is a side view illustrating a part of an electrode tip dresser according to a first embodiment of the present invention.
Figure 2:
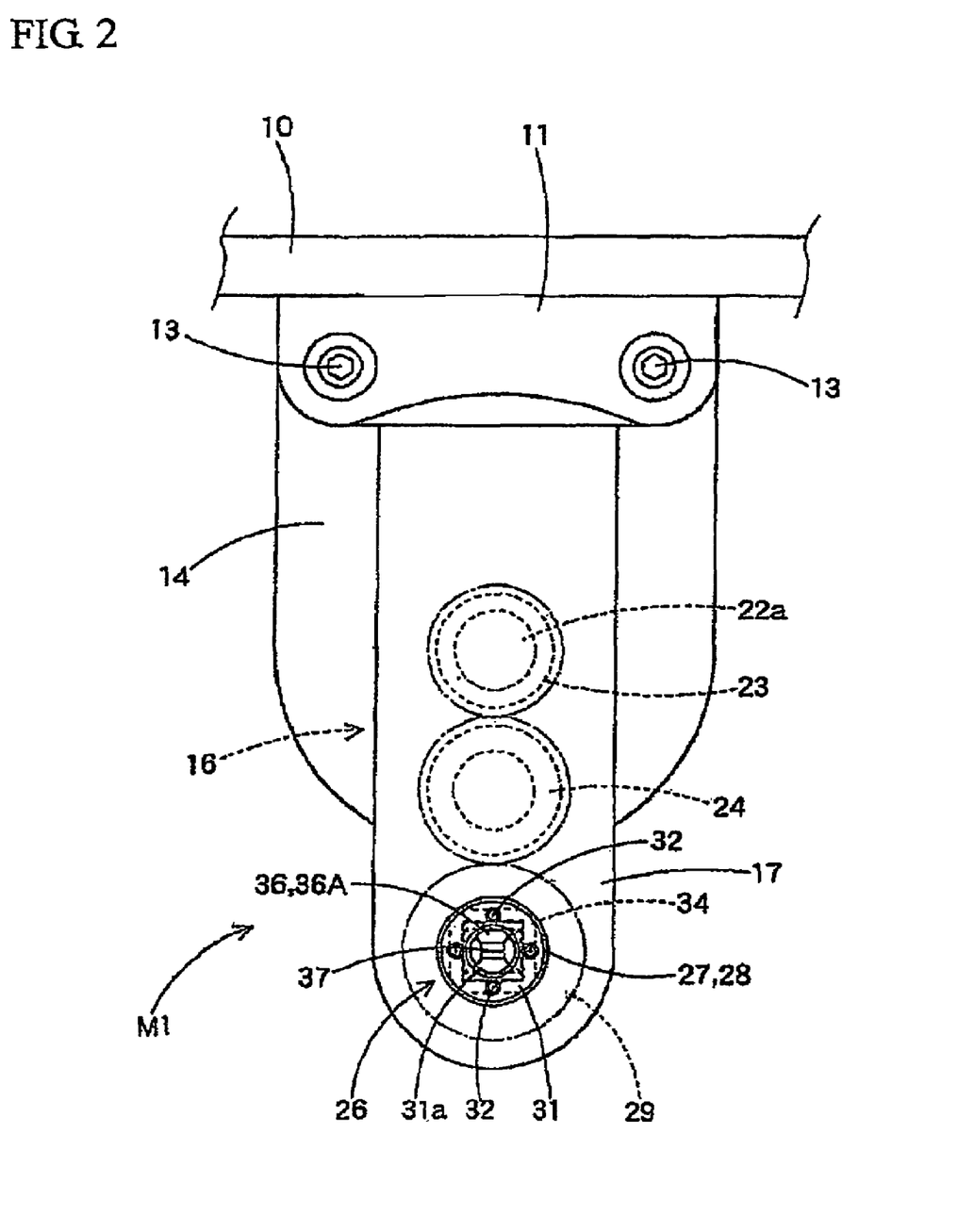
FIG. 2 is a schematic plan view illustrating the electrode tip dresser according to the first embodiment of the present invention.
Figure 3:
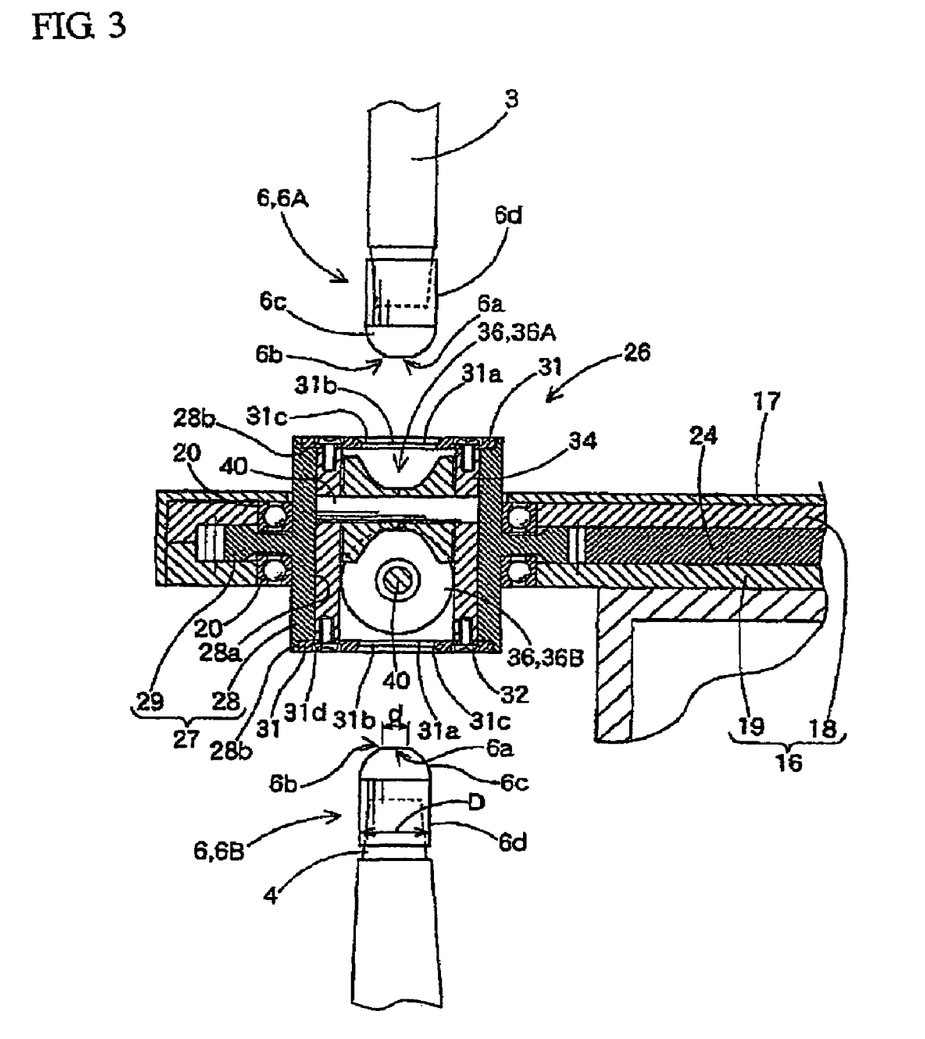
FIG. 3 is a longitudinal sectional view illustrating a main part of the electrode tip dresser according to the first embodiment of the present invention.

Referring to FIGS. 1 to 3, an electrode tip dresser M1 according to a first embodiment of the present invention is illustrated. As shown in FIGS. 1 to 3, the electrode tip dresser M1 according to the first embodiment of the present invention is adapted to dress a pair of electrode tips 6, namely, electrode tips 6A and 6B, respectively fitted in shanks 3 and 4 of a welding gun 1. The welding gun 1 is a servo gun which is mounted to a front end of an arm of a multi-joint welding robot not shown. The welding gun or servo gun 1 has a well-known structure having functions for holding the electrode tips 6A and 6B and moving the electrode tips 6A and 6B in accordance with operation of a servo motor 2 equipped with a built-in encoder, and a position control function for controlling relative movements of the electrode tips 6A and 6B with respect to each other. The servo gun 1 also has an operating function to control the RPM and torque of the servo motor 2, and to control the positions and pressure of the electrode tips 6A and 6B.

Each of the electrode tips 6A and 6B includes a tip section which contacts a work piece during a welding process, and a cylindrical shank section 6*d*. The tip section has a circular tip surface 6*a*, and an enlarged diameter portion 6*c* having a diameter increasing as the enlarged diameter portion 6*c* extends from a peripheral edge (angular portion) 6*b* of the tip surface 6*a* to the cylindrical shank section 6*d*. In the first embodiment of the present invention, the enlarged diameter portion 6*c* has an approximately hemispherical shape. Also, the tip surface 6*a* has a diameter d of 6 mm, and the shank section 6*d* has a diameter D of 16 mm. The diameters d and D are indicated in FIG. 3.

The electrode tip dresser M1 is arranged within a movement range of the servo gun 1 moved by operation of the welding robot. As shown in FIGS. 1 to 3, the electrode tip dresser M1 includes a support frame 10, a guide block 14, a gear case 16, a drive motor 222, and a dresser body 26.

Upper and lower brackets 11 and 12 are fixed to the support frame 10 arranged within the movement range of the servo gun 1. A pair of guide rods 13 extend vertically between the upper and lower brackets 11 and 13 at opposite sides of each bracket. Opposite ends of each guide rod 13 are mounted to the upper and lower brackets 11 and 13, respectively. The guide rods 13 extend vertically through the guide block 14 which is arranged at an approximately intermediate position between the upper and lower brackets 11 and 13. Accordingly, the guide block 14 is supported by the guide rods 13 such that the guide block 14 is slidable in an axial direction of the guide rods 13, namely, a vertical direction.

A pair of compression coil springs 15 are fitted around each guide rod 13 at upper and lower sides of the guide block 14, respectively. Totally, four coil springs 15 are arranged near a rear end of the guide block 14 positioned toward the support frame 10. One of the compression coil springs 15 fitted around each guide rod 13 is arranged between the upper bracket 11 and the upper surface of the guide block 14, whereas the other compression coil spring 15 fitted around each guide rod 13 is arranged between the lower surface of the guide block 14 and the lower bracket 12. By virtue of this arrangement, the guide block 14 is supported by the support frame 10 such that the guide block 14 is vertically movable in accordance with extension and contraction of the compression coil springs 15 caused by axial movements of the electrode tips 6A and 6B.

The gear case 16 is mounted on a front portion of the guide block 14. The gear case 16 includes an upper plate 18, and a lower plate 19 vertically spaced apart from the upper plate 18. A rotating barrel 27 is fitted in an opening formed through the front portion of the guide block 14, and is rotatably supported by bearings 20 arranged around the opening between the upper plate 18 and the lower plate 18. A cover 17 is mounted on the upper plate 18, to cover the upper and side surfaces of the upper plate 18.

A drive motor 22 is mounted to a lower surface of the gear case 16 at a rear portion of the gear case 16, in order to rotate the rotating barrel 27. The drive motor 22 has a drive shaft 22a on which a gear 23 is mounted. A gear 24 is meshed with the gear 23. The rotating barrel 27 has an annular gear portion 29 which is meshed with the gear 24.

The dresser body 26 includes a pair of dressing rollers 36, namely, dressing rollers 36A and 36B, two support shafts 40 which rotatably support the dressing rollers 36A and 36B, respectively, a holder 34 which rotatably holds the support shafts 40, and two guide members 31. The rotating barrel 27 is also included in the dresser body 26. The rotating barrel 27 retains the holder 34 therein.

Figure 4:
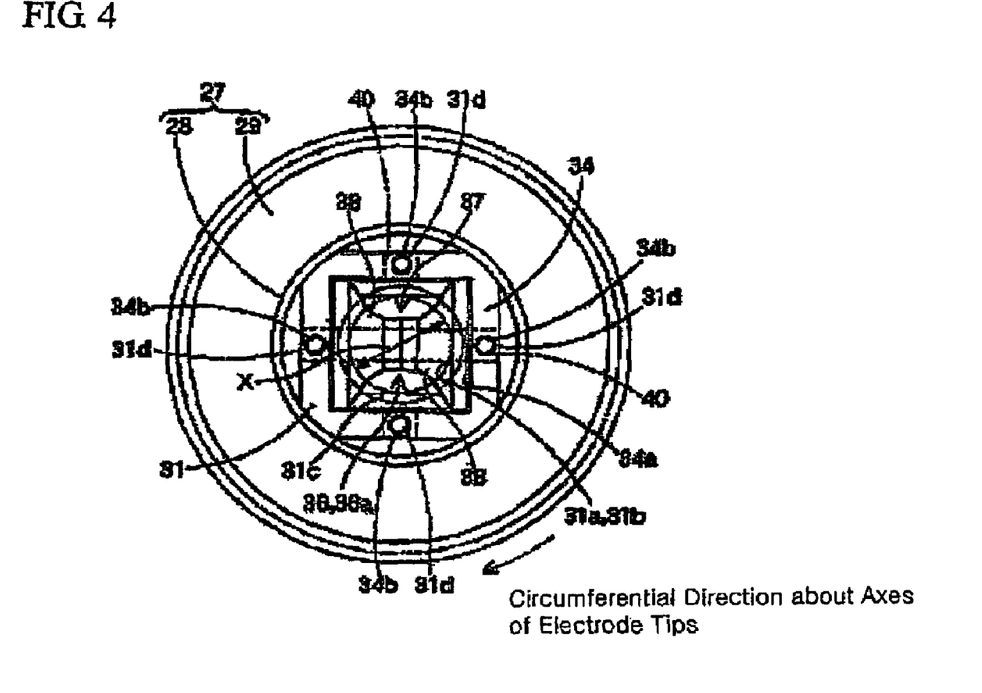
FIG. 4 is a schematic plan view illustrating a dresser body of the electrode tip dresser according to the first embodiment of the present invention.

As shown in FIGS. 2 to 4, the rotating barrel 27 includes a cylindrical member 28 arranged in an axial direction corresponding to a direction in which the electrode tips 6A and 6B move toward each other in a dressing process, namely, an approach direction of the electrode tips 6A and 6B. The gear portion 29 is also included in rotating barrel 27. The gear portion 29 is radially protruded from an outer peripheral surface of the cylindrical member 28 such that the gear portion 29 has an annular structure. As described above, the gear portion 29 is meshed with the gear 24. In the first embodiment of the present invention, the cylindrical member 28 is arranged such that its axis extends vertically. As described above, the rotating barrel 27 is rotatably supported by the gear case 16 via the bearings 20 respectively fitted around the cylindrical member 28 at upper and lower positions. The rotation direction of the rotating barrel 27 corresponds to a circumferential direction about the axes of the electrode tips 6A and 6B. In the first embodiment of the present invention, the rotating barrel 27 rotates horizontally about the electrode tips 6A and 6B in a dressing process.

The cylindrical member 28 is provided, at an inner periphery thereof, with a through hole 28a having a square cross-sectional shape. The cylindrical member 28 also has annular grooves 28b respectively formed around the through hole 28a at upper and lower ends of the cylindrical member 28. Circular-plate-shaped guide members 31 are fitted in the annular grooves 28b, respectively.

As shown in FIGS. 2 to 4, each guide member 31 has an annular structure in which a circular guide hole 31a is centrally formed. Each guide member 31 is also provided, at four positions, with fastening holes 31d to which screws 32 can be fastened, respectively. The guide hole 31a has an inner diameter X (FIG. 4) which is sufficient to allow the electrode tips 6A and 6B to pass through the guide hole 31a in a state in which the electrode tips 6A and 6B have been deformed after being used in a certain number of welding processes, but is approximate to the outer diameter D of the shanks 6d of the electrode tips 6A and 6B in order to enable the shanks 6d of the electrode tips 6A and 6B to be appropriately supported by an inner peripheral surface 31b of the guide member 31 in a dressing process (X=D+0.5 to 1.5 mm). In the first embodiment of the present invention, the inner diameter X is determined to be 16 mm+1 mm, namely, 17 mm. The guide member 31 also has a tapered surface 31c formed along the peripheral edge of the guide hole 31a such that the tapered surface 31c is recessed into the guide hole 31a, in order to guide the electrode tips 6A and 6B into the guide hole 31a.

As shown in FIGS. 2 to 6, the holder 34 has a square barrel structure having a through hole 34a extending in an axial direction corresponding to a direction in which the electrode tips 6A and 6B move toward each other in a dressing process (a vertical direction in the first embodiment). The holder 34 is fitted in the through hole 28a of the cylindrical member 28 included in the rotating barrel 27. The through hole 34a has a square cross-sectional shape. Around the through hole 34a, the holder 34 is also provided, at upper and lower ends thereof, with fastening holes 34b to which screws 32 can be fastened, respectively. The mounting of the holder 34 in the cylindrical member 28 of the rotating barrel 27 is achieved by fitting the holder 34 in the through hole 28a, and mounting the guide members 31 to the upper and lower ends of the holder 34 by use of the screws 32, to prevent the holder 34 from being separated from the through hole 28a. The holder 34 rotates circumferentially, namely, horizontally, about the electrode tips 6A and 6B, together with the rotating barrel 27, during operation of the electrode tip dresser M1 in a dressing process.

A pair of support holes 34c and a pair of support holes 34d are formed through a peripheral wall of the holder 34 such that the support holes 34c and 34d extend orthogonally to the axial direction of the through hole 34a while being arranged in parallel in a direction, in which the electrode tips 6A and 6B move toward each other in a dressing process, namely, a vertical direction. The support holes 34c and the support holes 34d are also arranged such that the axes thereof extend orthogonally to each other. The support holes 34c are arranged in series such that they face each other at opposite sides of the through hole 34a, in order to rotatably support the support shaft 40 of the dressing roller 36A. Similarly, the support holes 34d are arranged in series such that they face each other at opposite sides of the through hole 34a, in order to rotatably support the support shaft 40 of the dressing roller 36B.

As shown in FIGS. 3 to 6, the two support shafts 40 have a cylindrical rod shape, and rotatably support a pair of dressing rollers 36, namely, the dressing rollers 36A and 36B, between the portions of the support shafts 40 fitted in the support holes 34c and 34d, namely, in the through hole 34a of the holder 34, respectively.

As shown in FIGS. 2 to 6, each of the dressing rollers 36A and 36B has an approximately hourglass-shaped structure. A shaft hole 36a extends axially through each of the dressing rollers 36A and 36B. Each support shaft 40 extends through the shaft holes 36a of the associated dressing roller 36A or 36B. In order to reduce the area of the inner peripheral surface of the holder 34 contacting the dressing rollers 36A and 36B around the through hole 34a, small-diameter cylindrical portions 36b are protruded from opposite end surfaces of each dressing roller 36A or 36B around the associated shaft hole 36a, respectively.

The approximately hourglass-shaped structure of each dressing rollers 36A or 36B defines a groove 36c which has a cross-section conforming to the outline of the tip section of the associated electrode tip 6A or 6B when the cross-section is taken in a direction orthogonal to the associated support shaft 40, and the outline is taken after the dressing of the associated electrode tip 6A or 6B. That is, the groove 36c has shapes conforming to respective outline shapes of the tip-section-side portions of the associated electrode tip 6A or 6B defined when the electrode tip 6A or 6B starts a desired task in a state in which the electrode tip 6A or 6B can appropriately perform spot welding, namely, the outline shape of the tip surface 6a, the outline shape of the angular portion 6b, and the outline shape of the enlarged diameter portion 6c at the side of the angular portion 6b. Accordingly, it is possible to dress the electrode tips 6A and 6B to a usable state by moving the electrode tips 6A and 6B toward each other such that they are pressed against the dressing rollers 36A and 36B, while rotating the holder 34 in which the dressing rollers 36A and 36B are held by respective support shafts 40.

Each of the dressing rollers 36A and 36B includes two divided roller bodies 38 into which the dressing roller 36A or 36B is axially divided along a dividing plane 37. The dividing plane 37 is arranged at the center of the groove 36c of the associated dressing roller 36A or 36B in an axial direction of the dressing roller 36A or 36B, namely, the center of the tip surface 6a of the associated electrode tip 6A or 6B in a direction orthogonal to the axis of the electrode tip 6A or 6B, when viewing in a state in which the electrode tip 6A or 6B has been dressed.

In the first embodiment, the electrode tips 6A and 6B to be dressed have the same shape, and the dressing rollers 36A and 36B have the same shape. Also, the dividing plane 37 of the divided roller bodies 38 is arranged at the center of the associated dressing roller 36A or 36B having an approximately hourglass-shaped structure in the axial direction of the dressing roller 36A or 36B. Accordingly, a pair of dressing rollers 36A and 36B can be formed using four divided roller bodies 38 which have the same shape.

Hereinafter, operation of the electrode tip dresser M1 according to the first embodiment of the present invention will be described. After performing a certain number of spot welding processes, the welding robot positions the servo gun 1 near the electrode tip dresser M1, and simultaneously positions the electrode tips 6A and 6B such that the electrode tips 6A and 6B face each other in a vertical direction at upper and lower sides of the through hole 34a of the holder 34. In response to this operation, the electrode tip dresser M1 drives the drive motor 22 to generate a rotating force.

Thereafter, the servo gun 1 operates to move the electrode tips 6A and 6B toward each other and into the holder 34, thereby causing the electrode tips 6A and 6B to be pressed against the dressing rollers 36A and 36B, respectively. The dressing rollers 36A and 36B then rotate in circumferential directions about the axes of the electrode tips 6A and 6B, respectively, together with the holder 34, while rotating about respective support shafts 40. Thus, the dressing rollers 36A and 36B dress the electrode tips 6A and 6B such that the electrode tips 6A and 6B have a shape conforming to that of the grooves 36c.

Since each of the dressing rollers 36A and 36B is divided into two divided roller bodies 38 arranged at opposite sides of the dividing plane 37 positioned at the center of the tip surface 6a of the associated electrode tip 6A or 6B in a direction orthogonal to the axis of the electrode tip 6A or 6B, the divided roller bodies 38 of the dressing roller 36A or 36B dress the tip surface 6a and enlarged diameter portion 6c of the electrode tip 6A or 6B while rotating in opposite directions, respectively, during the rotation of the holder 34. Since the divided roller bodies 38 can continuously dress an integrated portion of the associated electrode tip 6A or 6B extending from the tip surface 61 to the enlarged diameter portion 6c via the angular portion 6b formed at the peripheral edge of the tip surface 61, it is possible to accurately dress the tip-section-side portions of each electrode tip 6A or 6B, namely, the tip surface 6a and the angular portion 6b arranged at the peripheral edge of the tip surface 6a, to desired shapes, respectively.

Figure 5:
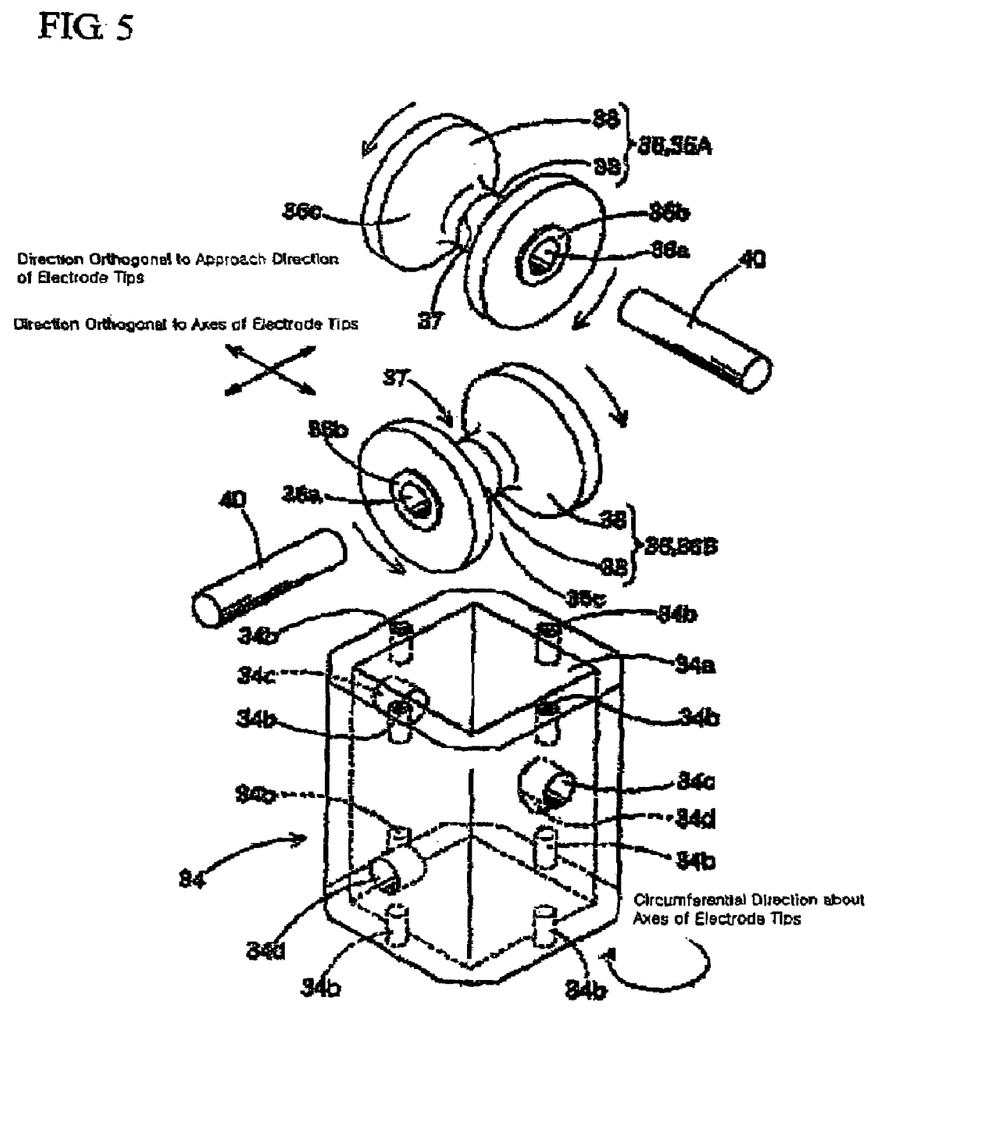
FIG. 5 is an exploded perspective view illustrating dressing rollers, support shafts, and a holder which are included in the electrode tip dresser according to the first embodiment of the present invention.
Figure 6:
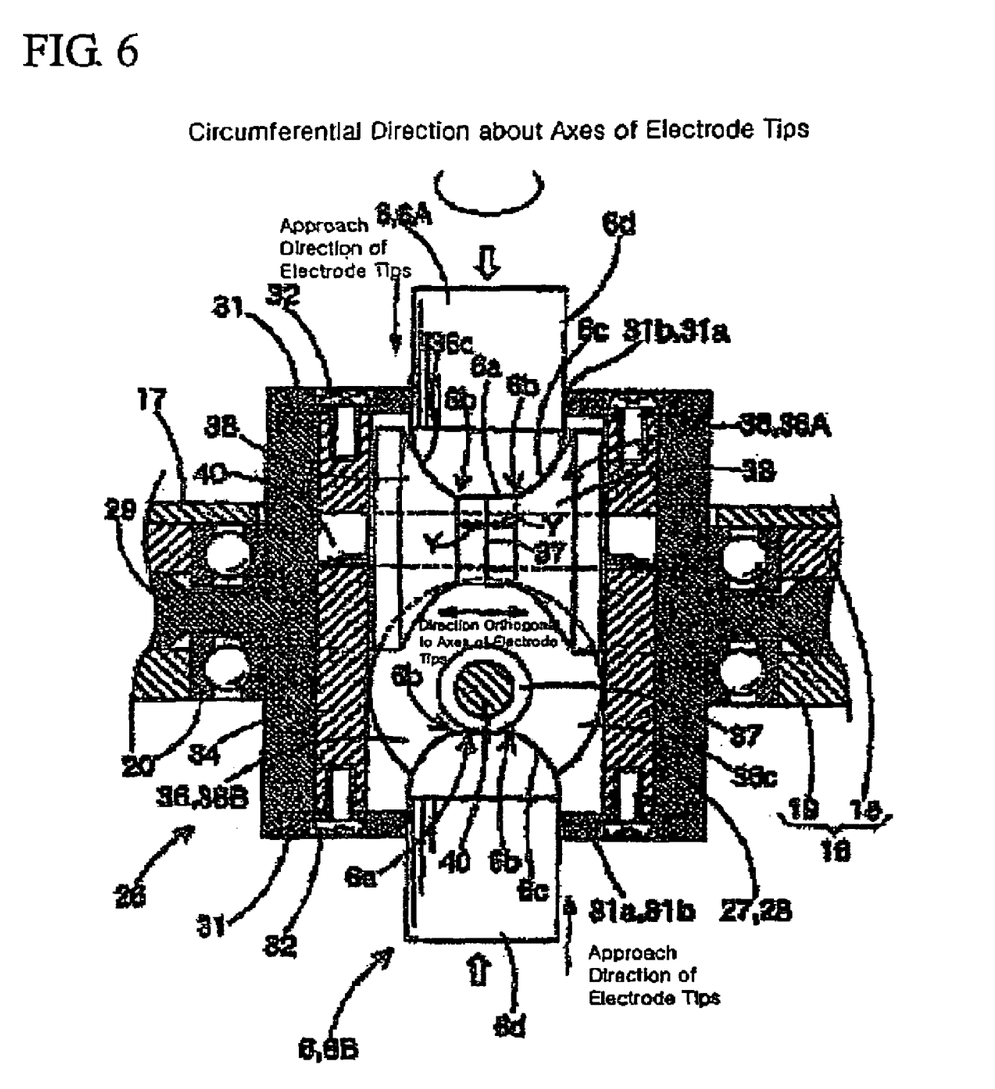
FIG. 6 is a sectional view illustrating a part of the electrode tip dresser according to the first embodiment of the present invention during a dressing process.

Meanwhile, when the holder 34 rotates clockwise in a circumferential direction about the axes of the electrode tips 6A and 6B in a horizontal plane, as shown in FIGS. 4 and 5, the divided roller bodies 38 of the dressing roller 36A are rotated about the associated support shaft 40 in opposite directions, respectively, due to frictional resistance occurring between each roller half 38 and the electrode tip 6A, as indicated by arrows in FIG. 5. Of course, when the holder 34 rotates counter-clockwise as the rotation direction of the holder 34 is reversed, the divided roller bodies 38 of the dressing roller 36A are rotated in directions reverse to the directions indicated by the arrows of FIG. 5, respectively.

In the first embodiment, the contact between the dressing rollers 36A and 36B and the associated electrode tips 6A and 6B is approximately linear contact in an axial direction of the outer peripheral surfaces of the dressing rollers 36A and 36B. Accordingly, it is possible to plastically deform the electrode tips 6A and 6B at a low speed, even using a small pressure applied to the electrode tips 6A and 6B by the servo gun 1 such that the electrode tips 6A and 6B are moved toward each other, and thus, to dress the electrode tips 6A and 6B to a desired shape. Of course, it is possible to rapidly dress the entire portion of the tip section of each electrode tip 6A or 6B by increasing the RPM of the holder 34, even when only a portion of each electrode tip 6A or 6B is dressed.

Accordingly, the electrode tip dresser M1 according to the first embodiment of the present invention can rapidly dress the electrode tips 6A and 6B to a usable state because it is possible to secure a desired accuracy of the tip surface 6a of each electrode tip 6A or 6B including the angular portion 6b at the peripheral edge of the tip surface 6a without separating the electrode tips 6A and 6B and without resulting in formation of swarf.

Meanwhile, in the first embodiment, the pressure of the electrode tips 6A and 6B applied to the dressing rollers 36A and 36B is set to 2,942 N (300 Kgf), and the RPM of the holder 34 is set to 900 rpm. In this case, accordingly, it was possible to dress the used electrode tips 6A and 6B to a usable state within about 1 to 3 seconds. When the RPM of the holder 34 was set to 500 rpm, it was possible to dress the electrode tips 6A and 6B to a usable state within about 10 seconds. In this case, however, an increased dressing time was taken. For this reason, it is preferred that the RPM of the holder 34 be 500 rpm or more. Also, in the first embodiment, the electrode tips 6A and 6B are made of chromium-copper, and the dressing rollers 36A and 36B, support shafts 40, and holder 34 are made of alloyed tool steel.

Since the support shafts 40 of the dressing rollers 36A and 36B are arranged to be orthogonal to each other, in the electrode tip dresser M1 of the first embodiment, various functions and effects are obtained. This will be described in detail hereinafter.

Each of the dressing rollers 36A and 36B has an approximately hourglass-shaped structure such that the dressing roller 36A or 36B has the groove 36c which has a cross-section conforming to the outline of the tip section of the associated electrode tip 6A or 6B when the cross-section is taken in a direction orthogonal to the associated support shaft 40, and enlarged diameter portions which are arranged at opposite axial ends of the dressing roller 36A or 36B. Accordingly, when the dressing rollers 36A and 36B are arranged such that the support shafts 40 thereof are orthogonal to each other, it is possible to closely arrange the support shafts 40 without causing the enlarged diameter portions of the dressing rollers 36A and 36B to interfere with each other. Therefore, it is possible to reduce the installation space of the dressing rollers 36A and 36B, as compared to the case in which the dressing rollers 36A and 36B are arranged such that the support shafts 40 are parallel to each other. Thus, it is possible to reduce the volume, in particular, thickness, of the holder 34. By virtue of this fact, it is possible to install the electrode tip dresser M1 within a reduced space in a place where a welding task is carried out.

In the first embodiment of the present invention, as described above, the guide members 31 are arranged in the vicinity of the holder 34. Each guide member 31 is provided with the guide hole 31a to guide the associated electrode tip 6A or 6B when the electrode tip 6A or 6B is pressed against the associated dressing roller 36A or 36B, in order to suppress the shank section 6d of the electrode tip 6A or 6B from being joggled in a direction orthogonal to the axial direction of the electrode tip 6A or 6B by the inner peripheral surface 31b.

When the dressing rollers 36A and 36B have a small outer diameter, there may be a possibility that the electrode tips 6A and 6B may escape from the outer peripheral surfaces of the dressing rollers 36A and 36B when the electrode tips 6A and 6B are pressed against the dressing rollers 36A and 36B, respectively. This possibility can be prevented by restraining the outer peripheral surface of the shank section 6d of each electrode tip 6A or 6B by the inner peripheral surface 31b of the guide hole 31a of the associated guide member 31. That is, it is possible to smoothly dress the electrode tips 6A and 6B even when the dressing rollers 36A and 36B are configured to have a small outer diameter in order to reduce the installation space of the electrode tip dresser M1.

Figure 7:
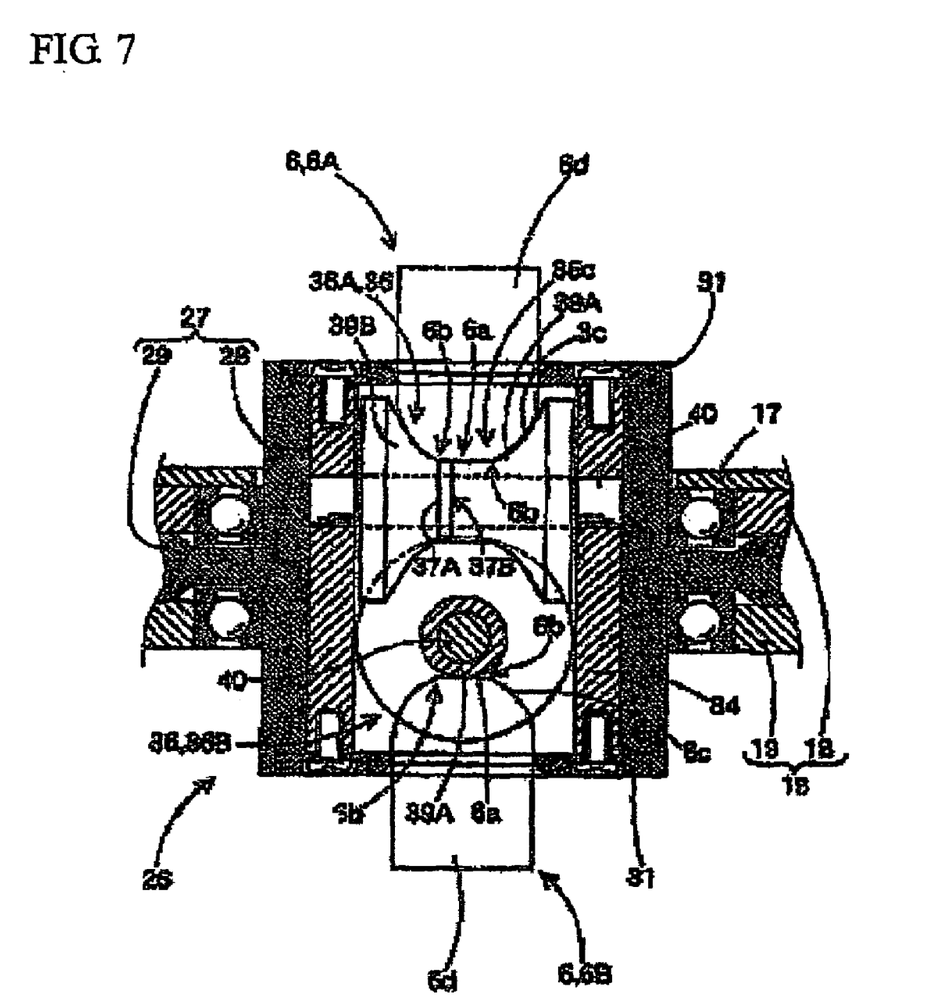
FIG. 7 is a sectional view illustrating dressing rollers according to a modified example of the first embodiment of the present invention.

Meanwhile, in the first embodiment of the present invention, the dividing plane 37 of the divided roller bodies 38 constituting each dressing roller 36A or 36B is illustrated as being arranged at the center of the tip surface 6a of the associated electrode tip 6A or 6B in a direction orthogonal to the axis of the electrode tip 6A or 6B, when viewing in a state in which the electrode tip 6A or 6B has been dressed. The dividing plane of the divided roller bodies may be arranged in a region Y (FIG. 6) extending from the edge of the tip surface 6a to the center of the tip surface 6a in a direction orthogonal to the axis of the associated electrode tip 6A or 6B, when viewing in a state in which the electrode tip 6A or 6B has been dressed. This is because it is desirable to dress each electrode tip 6A or 6B such that the angular portion 6b formed at the peripheral edge of the tip surface 6a of the electrode tip 6A or 6B is dressed continuously and integrally with parts of the tip surface 6a and enlarged diameter portion 6c arranged near the angular portion 6b, in order to obtain a high dressing accuracy. Therefore, in the case of divided roller bodies 39A and 39B shown in FIG. 7, they may be configured such that the dividing plane 37A thereof may be arranged at the peripheral edge of the tip surface 6a of the associated electrode tip 6A or 6B in a plane orthogonal to the axis of the electrode tip 6A or 6B, when viewing in a state in which the electrode tip 6A or 6B has been dressed. In this case, the divided roller bodies 39A and 39B can continuously dress the associated electrode tip 6A or 6B over a region extending from the tip surface 6a to the enlarged diameter portion 6c via the angular portion 6b. Accordingly, it is possible to dress the section of each electrode tip 6A or 6B extending from the tip surface 6a to the enlarged diameter portion 6c via the angular portion 6b while obtaining a high dressing accuracy. Since the dividing plane of the divided roller bodies may be arranged in a region Y (FIG. 6) extending from the edge of the tip surface 6a to the center of the tip surface 6a in a direction orthogonal to the axis of the associated electrode tip 6A or 6B, when viewing in a state in which the electrode tip 6A or 6B has been dressed, as described above, it may be possible to arrange the dividing plane of the divided roller bodies between the center of the tip surface 6a and the angular portion 6b, as in the case of a dividing plane 37b indicated by a double-dotted line in FIG. 7.

Of course, when the dividing plane 37 is arranged at the center of the tip surface 6a, as in the first embodiment, it is possible to use the divided roller bodies 38 having the same structure, and thus, to correspondingly reduce the number of the constituent elements of the electrode tip dresser M1.

Figure 8:
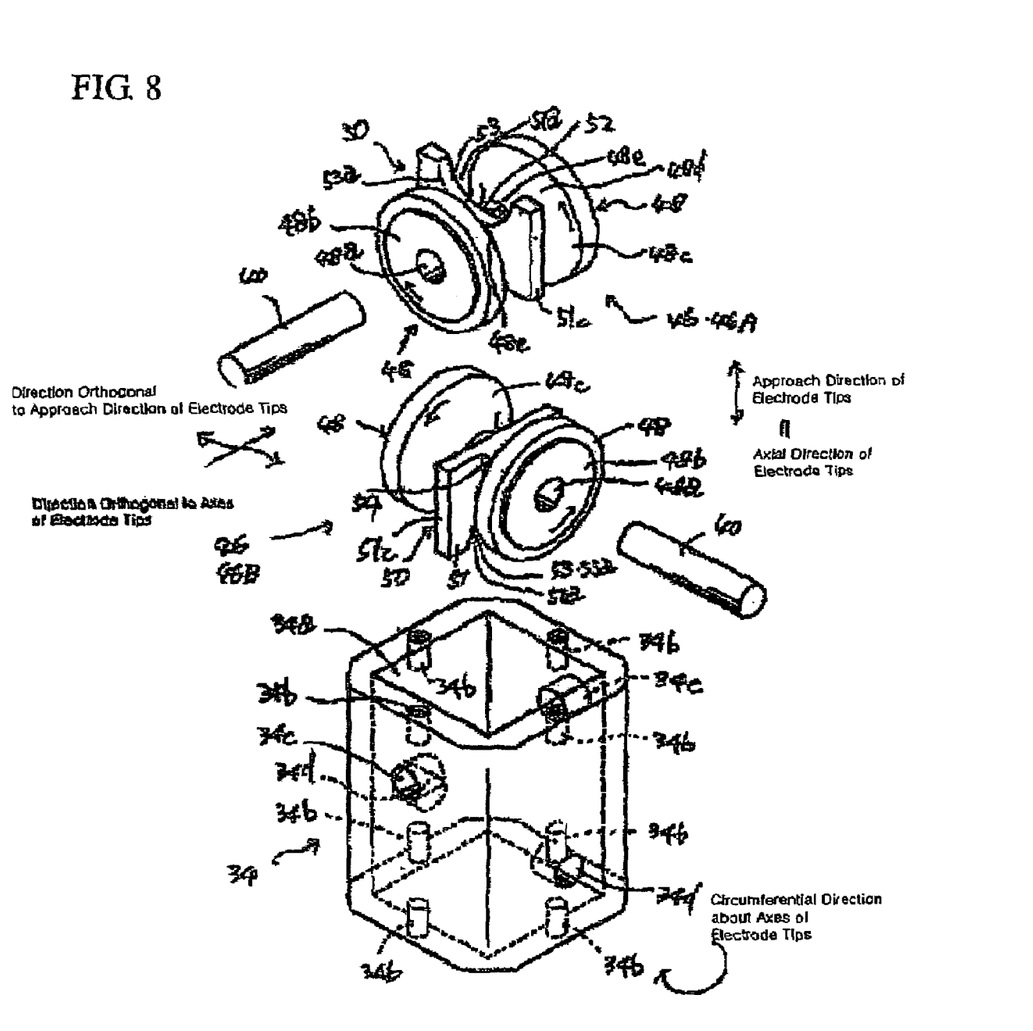
FIG. 8 is an exploded perspective view illustrating dressing rollers, support shafts, and a holder which are included in an electrode tip dresser according to a second embodiment of the present invention.

Referring to FIG. 8, an electrode tip dresser M2 according to a second embodiment of the present is illustrated. The electrode tip dresser M2 includes a configuration in which cutters 50 are provided at a pair of dressing rollers 46, namely, dressing rollers 46A and 46B, included in a dresser body 26A, respectively.

Meanwhile, the configuration in the second embodiment of the present invention, except for the dressing rollers 46 of the dresser body 26A, namely, the configuration including the support shaft 40 for supporting each roller 46, the holder 34 for rotatably holding each support shaft 40, and the rotating barrel 27, is identical to those of the first embodiment of the present invention. Accordingly, the elements included in this configuration are designated by the same reference numerals as those of the first embodiment, respectively, and no description thereof will be given. Also, the configuration of the second embodiment, except for the dresser body 26A, namely, the configuration for driving the dresser body 26A, which includes the gear case 16, the drive motor 22, and the guide block 14, is identical to that of the first embodiment. Accordingly, no description will be given of the elements included in this configuration.

In accordance with the second embodiment of the present invention, each of the dressing rollers 46 includes a pair of divided roller bodies 48 which are arranged at opposite end portions of the associated support shaft 40, and have an approximately truncated conical shape, and a cutter 50 which is arranged between the divided roller bodies 48, in order to dress a pair of electrode tips 6, namely, electrode tips 6A and 6B, to a usable state when the electrode tips 6A and 6B are pressed against the dressing rollers 46 in an approach direction of the electrode tips 6A and 6B under the condition in which the holder 34 rotates.

Figure 9:
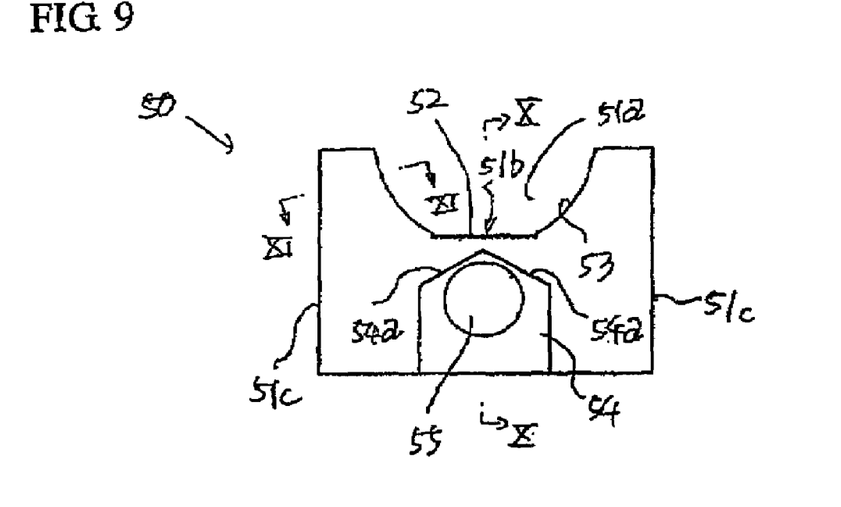
FIG. 9 is a front view illustrating a cutter included in the electrode tip dresser according to the second embodiment of the present invention.
Figure 10:
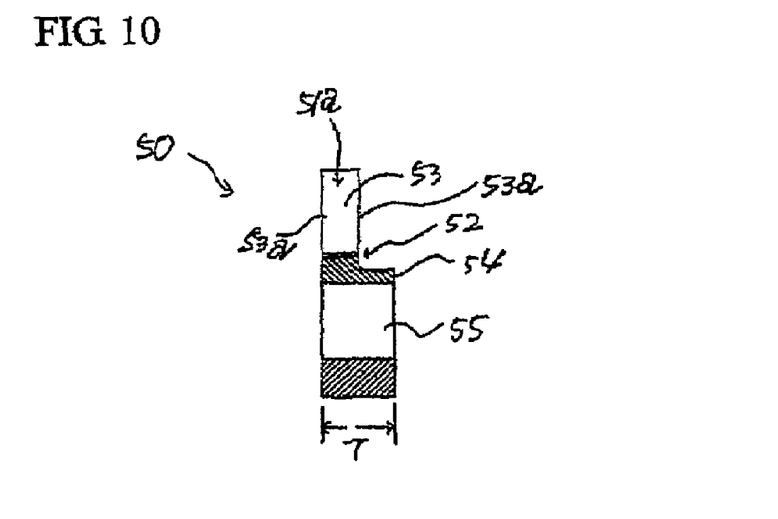
FIG. 10 is a cross-sectional view taken along the line X-X in FIG. 9, illustrating the cutter included in the electrode tip dresser according to the second embodiment of the present invention.
Figure 11:
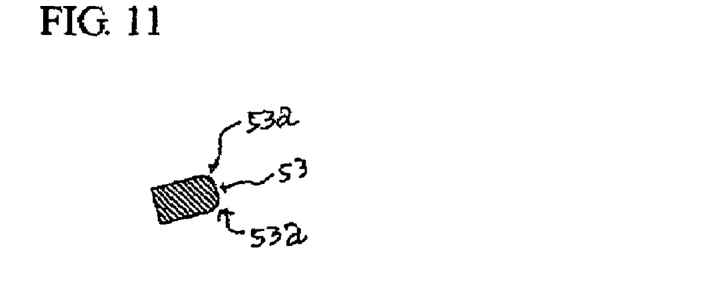
FIG. 11 is a cross-sectional view taken along the line XI-XI in FIG. 9, illustrating a part of the cutter included in the electrode tip dresser according to the second embodiment of the present invention.

As shown in FIGS. 9 to 11, each cutter 50 has a plate structure provided with a cutting blade 52, in order to cut the associated electrode tip 6 during the rotation of the holder 34 such that the tip surface 6a of the electrode tip 6 is dressed to a usable state. The cutting blade 52 extends in a direction orthogonal to the axis of the associated support shaft 40.

Each cutter 50 includes a plate-shaped cutter body 51 which is provided with a recess 51a slightly larger than the outline of the tip section of the associated electrode tip 6. The recess 51a has a flat portion 51b formed at the bottom of the recess 51a. The cutting blade 52 has a rectilinear shape, and is formed at an edge of the flat portion 51b of the recess 51a. A protrusion 54, which has a pentagonal pillar shape, is protruded from a front surface of the cutter body 51 at the side of the cutting blade 52. The protrusion 54 is provided with crest-shaped guide surfaces 54a formed at an apex portion of the protrusion 54 arranged toward the cutting blade 52, in order to discharge swarf, produced during a cutting process using the cutting blade 52, along opposite sides of the protrusion 54 from the apex of the protrusion 54 in a distributed manner. The cutter body 51 is also formed with a shaft hole 55 in a region including the protrusion 54, in order to fit the associated support shaft 40 in the shaft hole 55 in a thickness direction of the cutter body 51.

The cutter 50 is shaped such that, when the cutter 50 is inserted into the holder 34 under the condition in which the support shaft 40 is fitted in the shaft hole 55, opposite side surfaces 51c laterally spaced away from the shaft hole 55 are supported by the inner peripheral surface of the through hole 34a of the holder 34. When the holder 34 rotates, the cutting blade 52 centrally formed at the recess 51a is rotated in a circumferential direction about the axis of the associated electrode tip 6 while being maintained in parallel to the tip surface 61 of the electrode tip 6.

In the second embodiment of the present invention, as shown in FIGS. 10 and 14, the cutting blade 52 has a length L set to be larger than the diameter d of the tip surface 6a of the electrode tip 6 (in the illustrated embodiment, set to be 8 mm). Also, the thickness T of the cutter 50 including the protrusion 54 is set to be smaller than the diameter d of the tip surface 6a of the electrode tip 6 (in the illustrated case, set to be 5.5 mm). Meanwhile, the cutting blade 52 is arranged at a central position in a thickness direction of the cutter 5.

In order to prevent each electrode tip 6 from joggling in a direction orthogonal to the axis of the electrode tip 6 during a dressing process, the inner peripheral surface of the recess 51 of the associated cutter 50 provides restraining surfaces 53 for restraining the enlarged diameter portion 6c of the electrode tip 6. Each restraining surface 53 has arc-shaped surfaces 53a at opposite edges of the restraining surface 53 in a thickness direction of the restraining surface 53, in order to prevent the restraining surface 53 from damaging the enlarged diameter portion 6c when the restraining surface 53 comes into contact with the enlarged diameter portion 6c (refer to FIG. 11). Meanwhile, the dimension of each restraining surface 53 is set to secure a gap h of about 0.3 mm in an axial direction of the electrode tip 6 between the restraining surface 53 and the enlarged diameter portion 6c of the electrode tip 6 after completion of an appropriate dressing of the electrode tip 6 in the illustrated embodiment.

Each divided roller body 48 of each dressing roller 46 has an approximately truncated conical structure, through which the shaft hole 48a extends centrally to receive the associated support shaft 40. Small-diameter cylindrical portions 48b are protruded from respective larger-diameter end surfaces of the divided roller bodies 48 arranged at opposite sides of the associated support shaft 40 around the shaft hole 48a, in order to reduce the frictional resistance generated between the larger-diameter end surface of each divided roller body 48 and the inner peripheral surface of the holder 34.

Each divided roller body 48 has a structure including a groove 48c which has a portion having a cross-section conforming to the outline of the enlarged diameter portion 6c of the associated electrode tip 6, and a portion having a cross-section confirming to the outline of a portion of the electrode tip 6 extending from the enlarged diameter portion 6c toward the tip surface 6c of the electrode tip 6, when the cross-sections are taken in a direction orthogonal to the axis of the associated support shaft 40, and the outlines are taken after the dressing of the electrode tip 6. That is, as shown in FIG. 8, the groove 48c includes a main portion 48d which conforms to the outline of the enlarged diameter portion 6c of the associated electrode tip 6 in a dressed state of the electrode tip 6, and an extension portion 48e which is connected to the main portion 48d, is arranged at the side of the cutter 50, and extends from the main portion 48d toward the support shaft 40.

In the second embodiment of the present invention, the divided roller bodies 48 of each dressing roller 46 are fitted in the through hole 34a of the holder 34 under the condition in which the divided roller bodies 48 are arranged such that the smaller-diameter end surfaces thereof face each other at opposite sides of the cutter 50. In this state, the support shaft 40 is inserted into the shaft holes 48a and 55 via the support holes 34c and 34d. In such a manner, the dressing rollers 46A and 46B can be accurately fitted in the through hole 34a of the holder 34 under the condition in which the end surface of the cylindrical portion 48b of each divided roller body 48 is in contact with the inner peripheral surface of the through hole 34a to prevent each divided roller body 48 and the cutter 50 from moving along the associated support shaft 40, while allowing each divided roller body 48 to rotate around the associated support shaft 40.

Meanwhile, the rotation trace of the grooves 48c of the divided roller bodies 48 in each dressing roller 46, which is formed with respect to the cutting blade 52 of the associated cutter 50 during rotation of the holder 34. The portion of the groove 48c of each divided roller body 48 corresponding to the main portion 48d has a cross-section conforming to the outline of the enlarged diameter portion 6c of the associated electrode tip 6 in a dressed state of the associated electrode tip 6, when viewing in a direction orthogonal to the axis of the electrode tip 6. Also, the portion of the groove 48c of each divided roller body 48 corresponding to the extension portion 48e extends to a region of the cutter body 51 beyond the cutting blade 52, when viewing in the direction orthogonal to the axis of the electrode tip 6.

Hereinafter, operation of the electrode tip dresser M2 according to the second embodiment of the present invention will be described. After performing a certain number of spot welding processes, the welding robot positions the servo gun 1 near the electrode tip dresser M2, and simultaneously positions the electrode tips 6A and 6B such that the electrode tips 6A and 6B face each other in a vertical direction at upper and lower sides of the through hole 34a of the holder 34, similarly to the case of the first embodiment. In response to this operation, the electrode tip dresser M2 drives the drive motor 22 to generate a rotating force.

Thereafter, the servo gun 1 operates to move the electrode tips 6A and 6B toward each other and into the holder 34, thereby causing the electrode tips 6A and 6B to be pressed against the dressing rollers 46A and 46B, respectively. The dressing rollers 46A and 46B then rotate in circumferential directions about the axes of the electrode tips 6A and 6B, respectively, together with the holder 34. Simultaneously, the divided roller bodies 48 of each dressing roller 46A or 46B are rotated about the associated support shaft 40, thereby dressing the enlarged diameter portion 6c of the associated electrode tip 6A or 6B such that the enlarged diameter portion 6c has a shape conforming to that of the grooves 48c. Also, the cutter 50 cuts the tip surface 6c of the associated electrode tip 6A or 6B using the cutting blade 52, to dress the tip surface 6c.

As described above, the groove 48c of each divided roller body 48 includes the main portion 48d which has a cross-section conforming to the outline of the enlarged diameter portion 6c of the associated electrode tip 6, and the extension portion 48e which is connected to the main portion 48d, is arranged at the side of the cutter 50, and extends from the main portion 48d toward the associated support shaft 40, when the cross-section is taken in a direction orthogonal to the axis of the support shaft 40, and the outline is taken after the dressing of the electrode tip 6. Accordingly, when the divided roller bodies 48 of each dressing roller 46 dress the enlarged diameter portion 6c of the associated electrode tip 6A or 6B by plastically deforming the enlarged diameter portion 6c, a surplus portion S of the tip material of the electrode tip 6A or 6B is extruded from the main portion 48d of the groove 48c along the extension portion 48e. The extruded surplus portion S of the tip material is cut by the cutting blade 52 of the cutter 50. Thus, it is possible to dress the tip section of each electrode tip 6, namely, the tip surface 6a and the angular portion 6b formed at the peripheral edge of the tip surface 6a, to a desired shape with a high accuracy.

Meanwhile, since the enlarged diameter portion 6c of each electrode tip 6 is not cut during the dressing process, even though the tip surface 6a of each electrode tip 6 is cut, it is possible to suppress formation of swarf as much as possible. That is, it is possible to dress the electrode tips 6 while suppressing the consumption of the tip material.

Accordingly, the electrode tip dresser M2 according to the second embodiment of the present invention can rapidly dress (regenerate) the electrode tips 6A and 6B to a usable state because it is possible to secure a desired accuracy of the tip surface 6a of each electrode tip 6A or 6B including the angular portion 6b at the peripheral edge of the tip surface 6a without separating the electrode tips 6A and 6B and while suppressing formation of swarf as much as possible.

As described above, in the second embodiment of the present invention, each cutter 50 is provided with the restraining surfaces 53 which are arranged at opposite sides of the cutting blade 52 in a direction orthogonal to the axis of the associated support shaft 40, and are adapted to restrain the enlarged diameter portion 6c of the associated electrode tip 6, in order to prevent the electrode tip 6 from joggling in the direction orthogonal to the axis of the electrode tip 6 during a dressing process. Accordingly, even in the case in which the dressing rollers 46A and 46B have a small outer diameter, it is possible to prevent the electrode tips 6 from escaping from the outer peripheral surfaces of the dressing rollers 46A and 46B when the electrode tips 6 are pressed against the dressing rollers 46A and 46B, respectively. This is because the electrode tips 6 are restrained by the restraining surfaces 53 of the cutters 5. Accordingly, it is possible to smoothly dress the electrode tips 6 even when the dressing rollers 46A and 46B are configured to have a small outer diameter in order to reduce the installation space of the electrode tip dresser M2.

As apparent from the above description, in accordance with the present invention, it is possible to dress a pair of electrode tips to a usable state while achieving a desired accuracy of the tip surface of each electrode tip including the peripheral edge of the tip surface, without separating each electrode tip from a welding gun.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrode tip dresser for dressing a pair of electrode tips for spot welding held by a welding gun, each of the electrode tips including a tip section and a cylindrical shank section, the tip section having a circular tip surface and an enlarged diameter portion having a diameter increasing as the portion extends from the peripheral edge of the tip surface to the shank section, the electrode tips being held by the welding gun such that the tip sections of the electrode tips are movable toward each other, the electrode tip dresser comprising:

a holder which is rotatable in a circumferential direction about a common axis of the electrode tips;

a pair of support shafts which are held by the holder, are arranged in parallel in an approach direction of the electrode tips, and extend in a direction orthogonal to the approach direction of the electrode tips; and a pair of dressing rollers which are rotatably supported by the support shafts, respectively, such that the dressing rollers are arranged in parallel in the approach direction of the electrode tips, and which dress the electrode tips to a usable state while rotating in accordance with the rotation of the holder when the electrode tips are pressed against the dressing rollers, respectively, as the electrode tips are moved toward each other, wherein each of the dressing rollers includes a groove which has a cross-section conforming to an outline of the tip section of an associated one of the electrode tips when the cross-section is taken in a direction orthogonal to an associated one of the support shafts, and the outline is taken after the dressing of the associated electrode tip, wherein each of the dressing rollers includes two divided roller bodies, into which the dressing roller is axially divided along a dividing plane, and the dividing plane is arranged in a region extending from a peripheral edge of the tip surface of the associated electrode tip to a center of the tip surface in a direction orthogonal to the axis of the associated electrode tip in a dressed state of the associated electrode tip.

2. The electrode tip dresser according to claim 1, wherein the support shafts extend orthogonally to each other.

3. The electrode tip dresser according to claim 1 or 2, further comprising:

guide members which are arranged in the vicinity of the holder, and are provided with guide holes to guide the electrode tips when the electrode tips are pressed against the dressing rollers, respectively, such that the shank sections of the electrode tips are prevented from being joggled in a direction orthogonal to the common axis of the electrode tips during a dressing process.

4. An electrode tip dresser for dressing a pair of electrode tips for spot welding held by a welding gun, each of the electrode tips including a tip section and a cylindrical shank section, the tip section having a circular tip surface and an enlarged diameter portion having a diameter increasing as the portion extends from the peripheral edge of the tip surface to the shank section, the electrode tips being held by the welding gun such that the tip sections of the electrode tips are movable toward each other, the electrode tip dresser comprising:

a holder which is rotatable in a circumferential direction about a common axis of the electrode tips;

a pair of support shafts which are held by the holder, are arranged in parallel in an approach direction of the electrode tips, and extend in a direction orthogonal to the approach direction of the electrode tips; and a pair of dressing rollers which are rotatably supported by the support shafts, respectively, such that the dressing rollers are arranged in parallel in the approach direction of the electrode tips, and which dress the electrode tips to a usable state while rotating in accordance with the rotation of the holder when the electrode tips are pressed against the dressing rollers, respectively, as the electrode tips are moved toward each other, wherein each of the dressing rollers includes a pair of divided roller bodies which are arranged at opposite end portions of an associated one of the support shafts, and have an approximately truncated conical shape, and a cutter which is arranged between the divided roller bodies, wherein the cutter is provided with a cutting blade which extends in a direction orthogonal to an axis of the associated support shaft, and cuts an associated one of the electrode tips during the rotation of the holder such that the tip surface of the associated electrode tip is dressed to a usable state, wherein each of the divided roller bodies includes a groove having a main portion which has a cross-section conforming to an outline of the enlarged diameter portion of the associated electrode tip in a dressed state of the associated electrode tip, when the cross-section is taken in a direction orthogonal to an associated one of the support shafts, and the outline is taken after the dressing of the associated electrode tip, and an extension portion which is connected to the main portion, is arranged at the side of the cutter, and extends from the main portion toward the associated support shaft.

5. The electrode tip dresser according to claim 4, wherein the cutter includes restraining surfaces which are arranged at opposite sides of the cutting blade in the direction orthogonal to the axis of the associated support shaft, respectively, to restrain the enlarged diameter portion of the associated electrode tip, and thus, to prevent the associated electrode tip from joggling in the direction orthogonal to the axis of the electrode tip during a dressing process.

* * * * *